Figure 1:
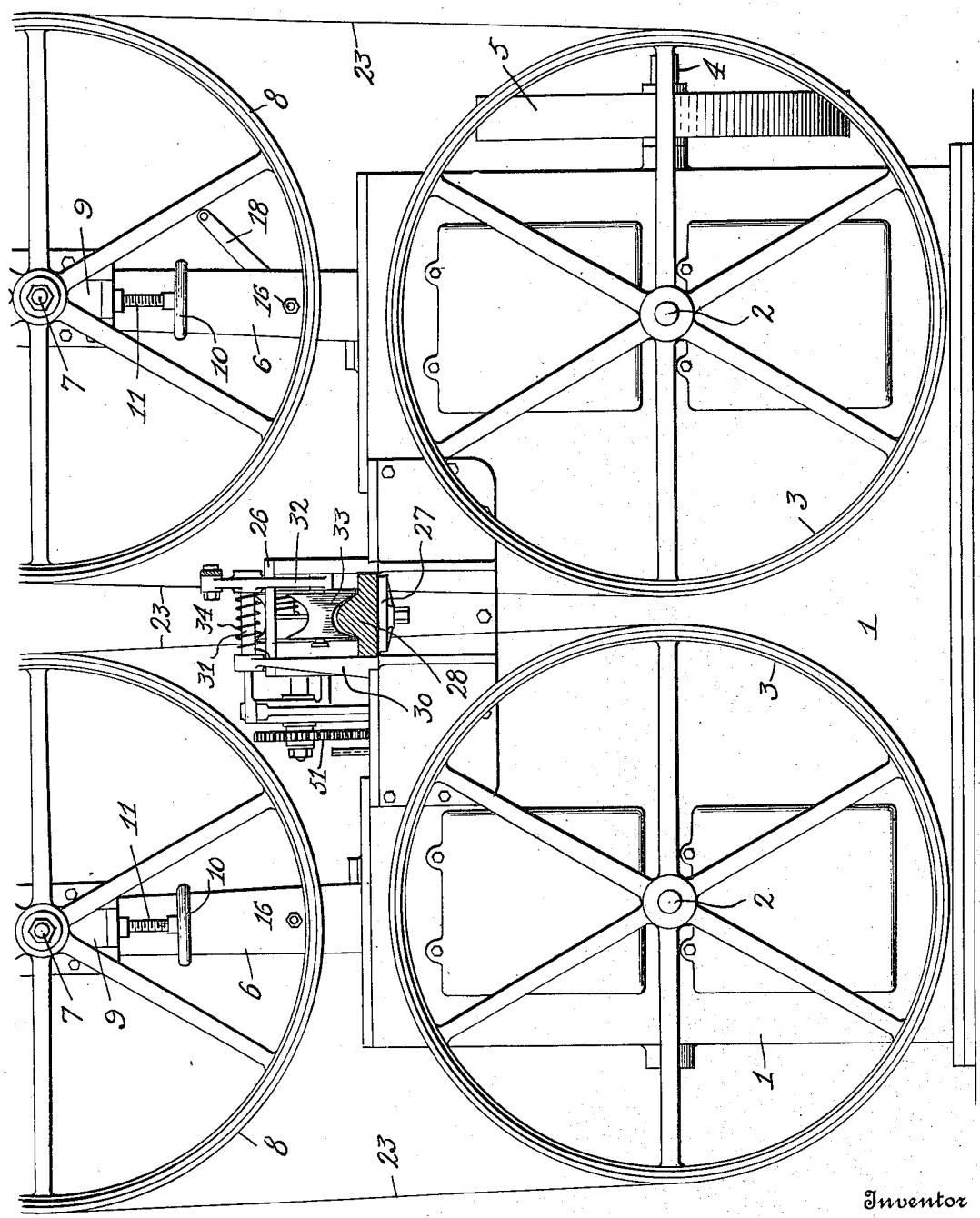

T. MIDGLEY.
FLAP TRIMMING MACHINE.
APPLICATION FILED AUG. 13, 1913.

1,190,315.

Patented July 11, 1916.
3 SHEETS—SHEET 1.

Witnesses
Edwin L. Yewell
A. L. Mills

Inventor
Thomas Midgley
By Percy B. Hills
Attorney

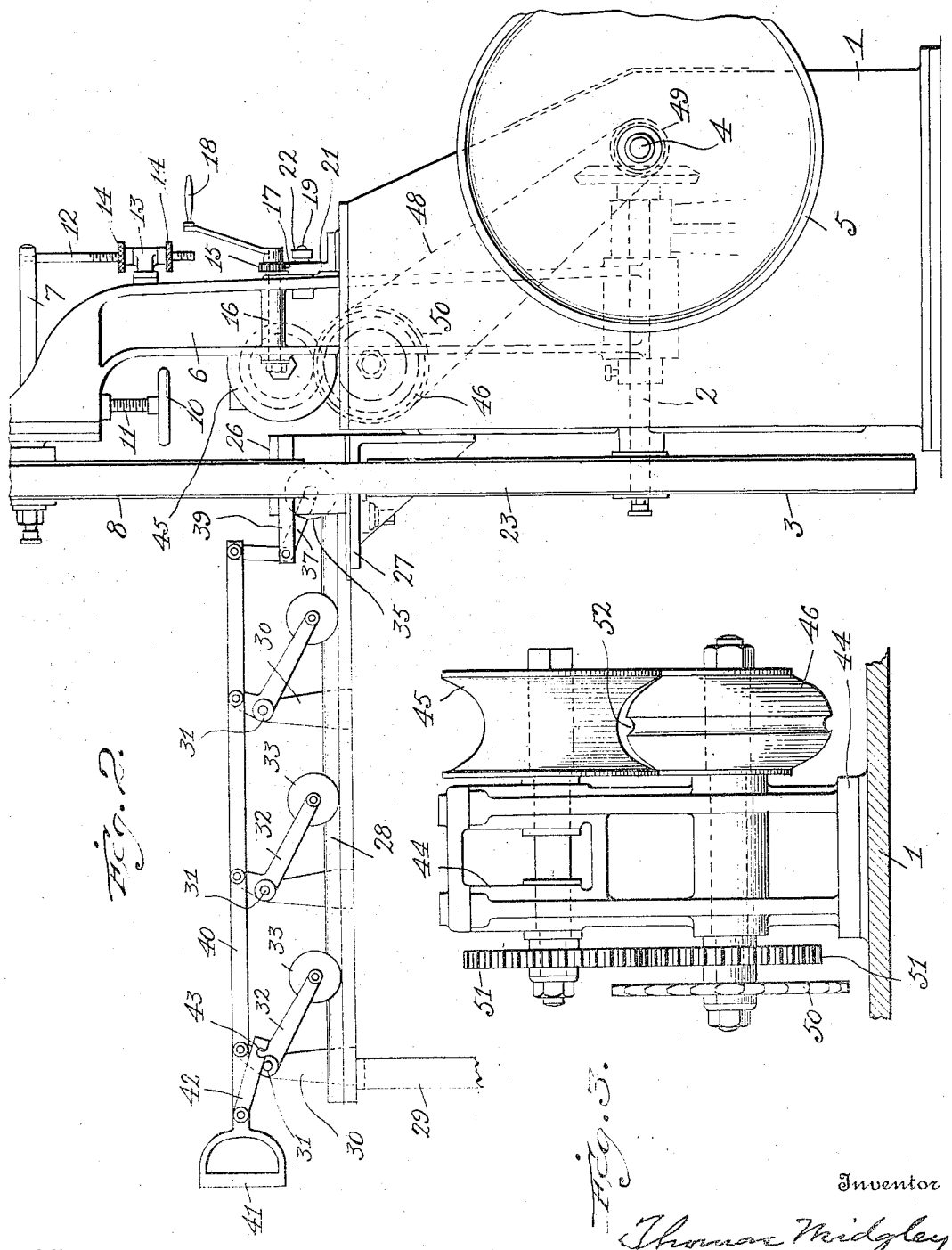

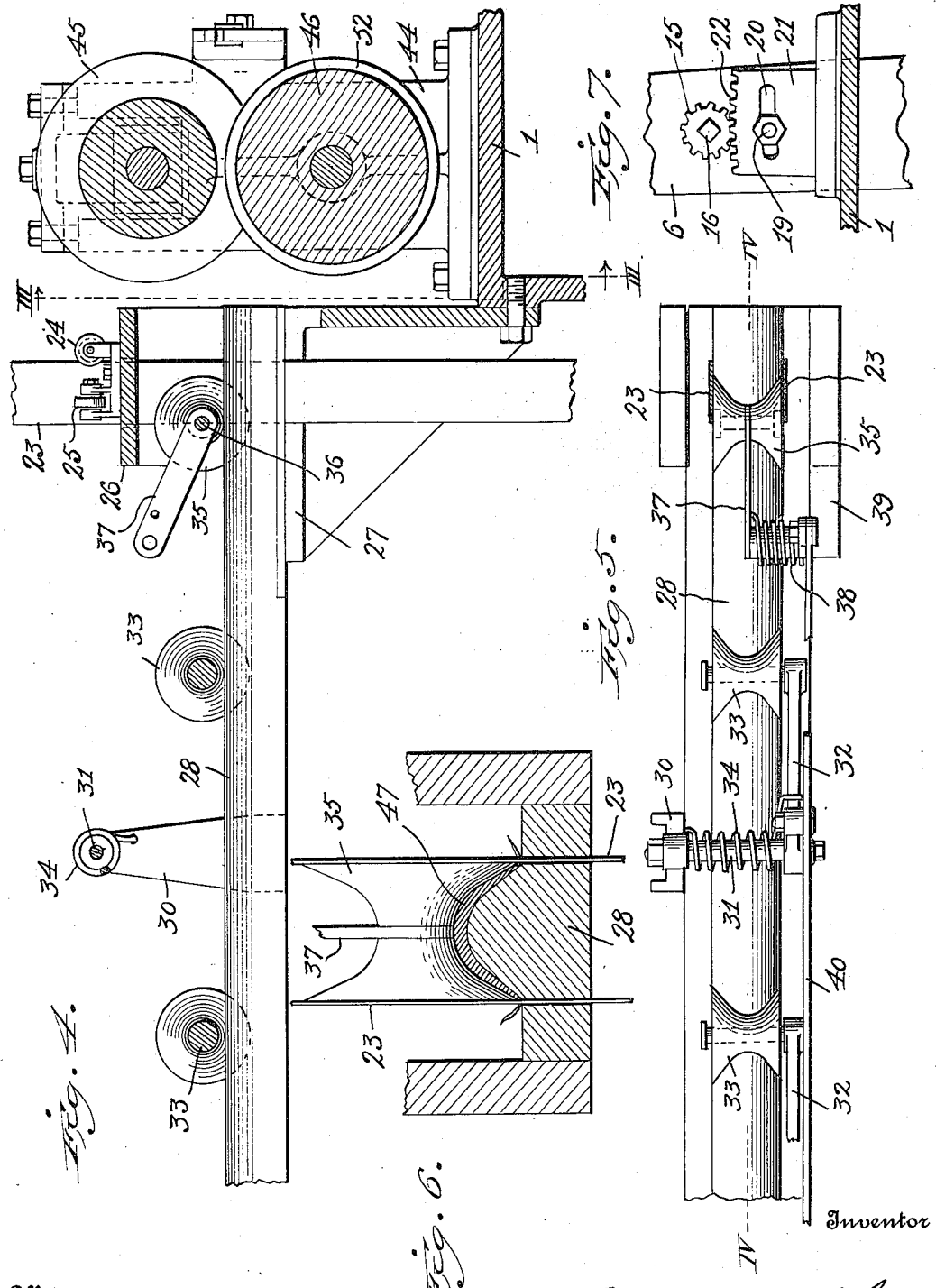

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

FLAP-TRIMMING MACHINE.

1,190,315.  Specification of Letters Patent.  Patented July 11, 1916.

Application filed August 13, 1913. Serial No. 784,530.

*To all whom it may concern:*

Be it known that I, THOMAS MIDGLEY, a citizen of the United States, residing at Worthington, in the county of Franklin and State of Ohio, have invented certain new and useful Improvements in Flap-Trimming Machines; and I do hereby declare the following to be a full, clear, and exact description of the invention, such as will enable others skilled in the art to which it appertains to make and use the same.

In the manufacture of automobile tire shoes it is common to apply thereto a flap, attached at one edge around the interior of the tire shoe, the same when in operative position spanning the opening in the tire shoe to better retain the inner tube in position. Said flaps are formed in substantially oval shape in cross area, and in the molding operation thereof there is produced on the edges a ragged excess of material, known as "flash," which it is necessary to trim off before the flaps can be used. This trimming has been done heretofore by hand, and it is the object of the present invention to provide a machine for removing expeditiously and effectually the same, the result being accomplished in the manner and by the means hereinafter described and claimed, reference being had to the accompanying drawing, in which:

Figure 1 is a front elevation of my improved machine, the feed table for the flaps being shown in section. Fig. 2 is a side elevation of the machine, partly broken away. Fig. 3 is a detail transverse section taken on the line 3—3, Fig. 4. Fig. 4 is a fragmentary enlarged central longitudinal sectional view of the machine. Fig. 5 is a detail top plan view of the feed table and its rollers, parts being removed. Fig. 6 is an enlarged detail transverse sectional view taken through the feed table at the rear edges of the band cutter knives. Fig. 7 is a detail front elevation of the adjusting mechanism for band cutter wheel brackets.

Similar numerals of reference denote corresponding parts in the several views.

In the said drawings the reference numeral 1 denotes the frame of the machine, in which are mounted two horizontally disposed shafts 2 carrying at their outer end the band wheels 3, and at their inner ends being geared to a transverse drive shaft 4, to the drive wheel 5 of which power is applied in any suitable manner. Carried by bracket 6, pivoted on shafts 2, are two shafts 7, upon the outer ends of which band wheels 8 are mounted, corresponding with band wheels 3 and disposed above the latter. The bearings of said shafts 7 are carried in slides 9, which are adjustable vertically by means of hand wheels 10 and screws 11, in a manner well understood. So also the inner ends of said shafts 7 may be adjusted vertically by means of the screw threaded rods 12 passing through extensions 13 on brackets 6, said rods 12 being adjusted in said extensions 13 by means of the set-nuts 14. As best seen in Fig. 7 the brackets 6, which are pivotally supported from shafts 2, are adjustable laterally at their upper ends by means of pinions 15 mounted on shafts 16 in said brackets, said pinions being in mesh with racks 17 supported by the frame 1. By means of a detachable crank 18 the brackets 6 thus may be adjusted laterally at their upper ends, and to provide for locking them in any adjusted position I provide bolts 19 in said brackets passing through elongated slots 20 in the extensions 21, which also carry the racks 17, set nuts 22 being provided for said bolts whereby when adjusted suitably said brackets 6 may be clamped in position. Passing around each pair of band wheels 3 and 8 is a band cutter 23, the same being guided near the cutting point by means of a rear grooved roller 24 and side guide rollers 25, mounted on a table 26 supported by bracket 27 bolted to the frame 1. Also supported at its inner end by said bracket 27 beneath the table 26, is a horizontally disposed support 28 conforming in cross area centrally on its upper surface to the configuration of the flaps to be trimmed. Said support is maintained at its outer end by legs 29, and has attached at intervals to its sides brackets 30 supporting shafts 31 to which are fixed bell cranks 32 carrying at their lower ends rollers 33 concaved to fit the configuration of the central portion of support 28. Each shaft 31 has coiled around it a spring 34 engaging its bracket 30 and the long arm of its bell crank 32 in such manner as to force its roller 33 into contact with the support 28. The rearmost roller 35 which is disposed beneath the table 26 is in immediate proximity to the cutting points of the band cutters 23, as seen in Figs. 4 and 6, the cutting edges of said band cutters passing through the tangential points of contact of the edges of said roller 35 with the flap being fed. Further, as seen in Figs. 5 and 6, the said band cutters 23 pass on opposite sides of and in immediate proximity to said roller which necessitates that its shaft 36 shall be supported centrally. Said roller, therefore, is formed in two parts brought together on the shaft 36 to inclose the crank arm 37, a spring 38 being interposed to cause said roller to act as do the rollers 33 and said crank arm 37 being pivotally supported by an arm 39 projecting from table 26. Pivotally connected with the upper arms of cranks 32 and 37 is a horizontal bar 40 having a handle 41 at its outer end, and a pivoted latch 42 adapted to rest on the shaft 31 of the outermost of the rollers 33, said latch being notched at 43 to engage said shaft 31 upon pulling said bar 40 to the left, which movement lifts rollers 33 and 35 from contact with support 28 and against the tension of their springs 34 and 38.

Mounted in a suitable bracket 44 bolted to the support 1 are the upper and lower feed rollers 45 and 46, the former being concaved and the latter convexed, as shown best in Fig. 3, to receive the flap 47 to be trimmed. These rollers are disposed in alinement with the support 28, but back of the band cutters 23 and act to pull or drag the flap through the machine and past the cutters 23, the power being supplied thereto by a sprocket chain 48 running from a sprocket 49 on shaft 4 to sprocket 50 on the shaft of the lower feed roller 46, said rollers being connected to rotate together by the gear wheels 51.

In operation the flap 47 which is to be trimmed is passed lengthwise along the support 28 beneath the rollers 33 and the innermost roller 35, said rollers being first raised against the tension of their springs 34 and 38 by a pull on the handle 41, which rocks the bell-cranks 32 and 37. As the flap 47 passes beneath the roller 35 its inner end may be hooked by a piece of wire (not shown) which is passed through a groove 52, turned in the lower feed roller 46 for that purpose, and thus drawn between said feed rollers 45 and 46 by which it is tightly gripped, said feed rollers serving in their rotation to draw along the said flap. As soon as this engagement of the flap 47 by said feed rollers 45 and 46 is effected the latch 42 is unhooked from shaft 31, thus releasing bar 40, whereupon the springs 34 and 38 will cause the rollers 33 and 35 to contact with the underlying flap 47, and thus guide it in its passage through the machine. By referring to Fig. 4 it will be observed that the cutting edges of the band cutters 23 register with the tangential points of contact of the edges of the roller 35 with the flap to be trimmed, and by reference to Figs. 5 and 6 it will be seen also that said band cutters pass through slots formed in the support 28 in immediate proximity to said roller 35, so that at the points where said band cutters sever the "flash" from the flap 47 said flap is held firmly against displacement upon the convexed portion of the support 28 by said roller 35, thus causing the band cutters 23 to effect a smooth even cut.

It will be apparent that by means of the hand wheels 10, the rods 12 and set nuts 14, and the pinions 15 and racks 17 any desired vertical, lateral or angular adjustment of the upper band wheels 8 may be effected and such adjustment may be of any desired fineness.

Having thus described my invention, what I claim as new and desire to secure by Letters Patent is:

1. In a machine of the character described, a support for receiving and guiding endwise the material to be trimmed to the trimming point, means at the trimming point coöperating with said support for maintaining the material in position on said support, means for trimming the material at the point of contact of the first named means therewith, and means for drawing the material past the trimming point.

2. In a machine of the character described, a support for receiving and guiding endwise the material to be trimmed to the trimming point, a roller at the trimming point coöperating with said support for maintaining the material in position on said support, band cutters for trimming the material and passing through the tangential points of contact of the roller therewith, and means for drawing the material past the trimming point.

3. In a machine of the character described, a support for receiving and guiding endwise the material to be trimmed to the trimming point, said support being shaped on its upper surface to conform to the shape of the material to be trimmed, a similarly shaped guide roller at the trimming point for pressing upon the material on said support to maintain the same in position thereon, means for trimming the material and passing through the tangential points of contact of the roller therewith, and means for drawing the material past the trimming point.

4. In a machine of the character described, a support for receiving and guiding endwise the material to be trimmed to the trimming point, said support being shaped on its upper surface to conform to the shape of the material to be trimmed, a similarly shaped guide roller at the trimming point for pressing upon the material on said support to maintain the same in position thereon, band cutters for trimming the material and passing through the tangential points of contact of the roller therewith, and means for drawing the material past the trimming point.

5. In a machine of the character described, a support for receiving and guiding endwise the material to be trimmed to the trimming point, said support being shaped on its upper surface to conform to the shape of the material to be trimmed, similarly shaped spring pressed guide rollers for pressing upon the material on said support to maintain the same in position thereon, means for simultaneously lifting said guide rollers from operative position, means for trimming the material, and means for drawing the material past the trimming point.

6. In a machine of the character described, a support for receiving and guiding endwise the material to be trimmed to the trimming point, said support being shaped on its upper surface to conform to the shape of the material to be trimmed, similarly shaped spring pressed guide rollers for pressing upon the material on said support to maintain the same in position thereon, means for simultaneously lifting said guide rollers from operative position, band cutters for trimming the material, and means for drawing the material past the trimming point.

7. In a machine of the character described, a support for receiving and guiding endwise the material to be trimmed to the trimming point, a guide roller located at the trimming point for pressing upon the material on the support at that point to maintain the same in position thereon, band cutters on opposite sides of said roller disposed with their cutting edges passing through the tangential points of contact of said roller with the material, and means for drawing the material past the cutting point.

8. In a machine of the character described, a support for receiving and guiding endwise the material to be trimmed, said support extending to the trimming point and being convexed on its upper surface to conform to the material to be trimmed, a guide roller located at the cutting point and concaved to conform to the convexity of said support and spring pressed upon the material on said support, band cutters on opposite sides of said roller disposed with their cutting edges passing through the tangential points of contacts of said roller with the material, and means for drawing the material past the cutting point.

9. In a machine of the character described, a support for receiving and guiding endwise the material to be trimmed to the trimming point, said support being shaped on its upper surface to conform to the shape of the material to be trimmed, similarly shaped guide rollers spring pressed upon the material on said support to maintain the same in position thereon, means for trimming the material, and co-acting rollers also conjointly shaped to conform to the material and adapted to seize the material and draw it past the trimming point.

10. In a machine of the character described, a support for receiving and guiding endwise the material to be trimmed to the trimming point, said support being shaped on its upper surface to conform to the shape of the material to be trimmed, similarly shaped guide rollers spring pressed upon the material on said support to maintain the same in position thereon, band cutters for trimming the material, and co-acting rollers also conjointly shaped to conform to the material and adapted to seize the material and draw it past the trimming point.

In testimony whereof I have hereunto set my hand in the presence of two subscribing witnesses.

THOMAS MIDGLEY.

Witnesses:
    JOHN CARLSON,
    J. H. SWIFT.